L. S. BACHE.
SELF LUBRICATING BEARING.
APPLICATION FILED APR. 13, 1916.
1,266,381.
Patented May 14, 1918.
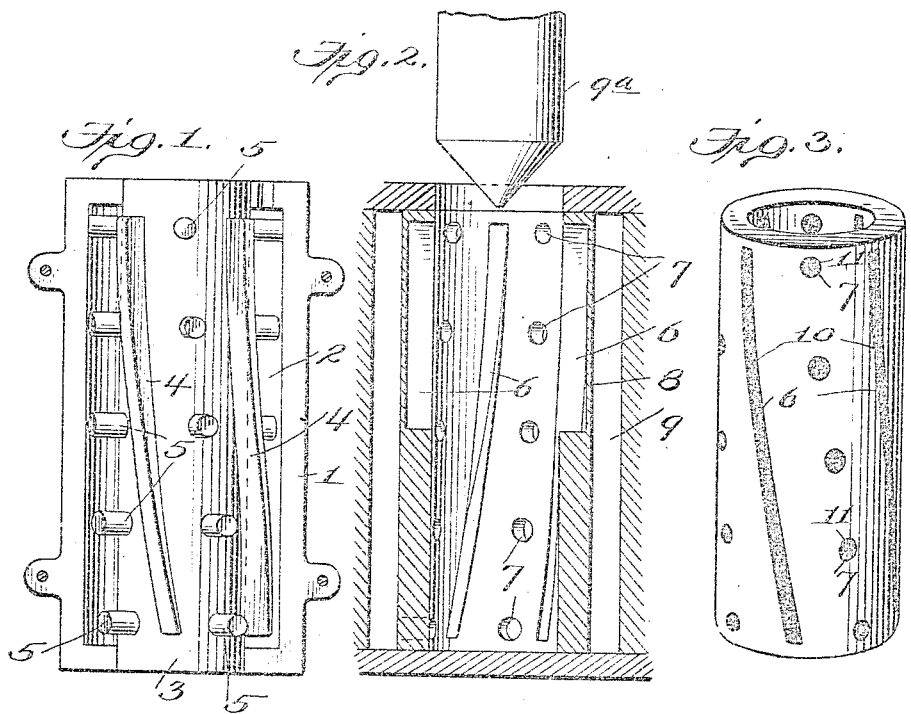
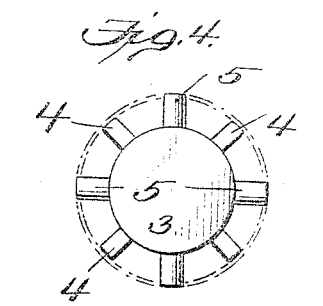
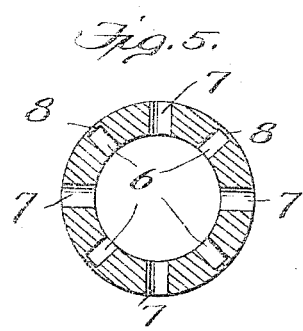
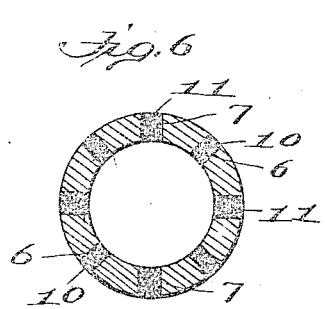
Witnesses:
Inventor
Leigh S. Bache
by James L. Norris
Attorney

UNITED STATES PATENT OFFICE.

LEIGH S. BACHE, OF MIDDLESEX BOROUGH, NEW JERSEY, ASSIGNOR TO BOUND BROOK OIL-LESS BEARING COMPANY, A CORPORATION OF NEW JERSEY.

SELF-LUBRICATING BEARING.

1,266,381.  Specification of Letters Patent.  Patented May 14, 1918.

Application filed April 13, 1916. Serial No. 90,899.

*To all whom it may concern:*

Be it known that I, LEIGH S. BACHE, a citizen of the United States, residing at borough of Middlesex, in the county of Middlesex and State of New Jersey, have invented new and useful Improvements in Self-Lubricating Bearings, of which the following is a specification.

My present invention relates to improvements in bearings, and more especially to those in the form of bushings or sleeves adapted to be interposed between relatively movable parts of machinery and the like.

The primary object of the invention is to provide a bearing of this character which is constructed in a novel way to afford pockets to contain graphite or other suitable lubricant for rendering the bearing self-lubricating. According to the present invention, the bushing or sleeve is so constructed that the lubricant-containing pockets are so disposed at the inner or outer surfaces thereof that some of the lubricant in the bushing will be presented at the point where the load is sustained by the bushing, irrespective of where the load may come around the bushing, and yet a maximum area of the metal portion of the bushing will sustain the load on the bushing, irrespective of where the load may come on the bushing. Furthermore, the pockets which serve to distribute the lubricant are so arranged in the bushing that the latter is not weakened to an extent that would permit distortion or breakage of the bushing under any load within the capacity for which the bushing is designed.

These features of the present invention render it particularly applicable to bushings which are employed between parts which have only a small degree of relative rotation or a rocking action as, for example, occurs between springs and shackles on automobiles or other vehicles where the load is great but the relative rotation between the bushing and its coöperating part or parts is comparatively small. Bushings embodying the present invention may be used advantageously where there is relative movement between the bushing and an inner shaft, stud or journal, or where there is relative rotation between the bushing and an outer bearing member or housing, or where the bushing may rotate relative to an inner shaft and also an outer bearing member or housing, the lubricant-containing pockets serving to lubricate both the inner and the outer surfaces of the bushing.

The present invention also provides an improved method of making the self-lubricating bushing as will hereinafter appear.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 shows a half of a mold, and a core therein, adapted to cast a bushing embodying the present invention.

Fig. 2 is a diagrammatic view showing a method of forcing the lubricant into the pockets of the bushing.

Fig. 3 is a perspective view of the finished self-lubricating bushing.

Fig. 4 is an end view of the core shown in Fig. 1.

Fig. 5 represents a transverse section through the bushing as it is cast and prior to the introduction of the lubricant and the finishing of the bushing.

Fig. 6 represents a transverse section through the finished lubricant-containing bushing.

Similar parts are designated by the same reference characters in the several views.

Bearing bushings embodying the present invention are capable of use in machinery or in places where it is necessary to support relatively movable or rotatable parts. The bushing is shown in its preferred form in the present instance, but it is to be understood that equivalent constructions within the scope of the claims are contemplated and will be included as within the invention. The preferred method of producing the bushing will also be hereinafter described, but it is to be understood that the invention is not limited to this precise procedure, as other methods of producing the bushing may be employed.

In the present instance, the body of the bushing is preferably cast in a mold which comprises two similar halves, one of the mold halves being shown and designated 1 in Fig. 1. The chamber 2 of the mold has a size and form corresponding to the desired dimensions of the bushing prior to the finishing thereof, and a core is used in the casting operation which preferably forms the bore in the bushing and also the pockets or cavities to receive the lubricant. Preferably, the core comprises a cylindrical body 3, the ends of which support and position it properly within the mold, and projections on the body of the core serve to form the lubricant-receiving pockets in the bushing. As shown, a set of four ribs 4 are provided on the exterior of the core. These ribs, as shown, are spaced equidistantly around the core and they terminate at points near the ends of the mold chamber. These ribs extend diagonally of the axis of the core, or in other words, they have a helical pitch, but the pitch is such that each rib extends but part way around the core. A series of projections 5 are provided on the body of the core in the space between each pair of ribs, there being, in the present instance, five of the projections spaced longitudinally of the core. The projections 5 on the core are preferably of a length sufficient to bring the outer ends of these projections into contact with the interior wall of the mold, whereas the ribs 4 are shallower and leave a space between their outer edges and the inner wall of the mold. The bushing is cast in the mold containing the core just described, and when cast, the bushing will have its inner bore and its outer surface shaped in conformity with the cylindrical body of the core and the interior chamber of the mold. The cast bushing will also have grooves 6 cast therein as counterparts of the ribs 4 on the core and perforations 7 as counterparts of the projections 5 of the core. The perforations 7 in the cast bushing will, however, extend entirely through the wall of the bushing while the grooves 6 will not penetrate the outer surface of the bushing but will be closed by relatively thin bodies of metal 8. The bushing may be cast from any suitable metal or material, bronze being generally used.

The bushing after having been cast in the form just described is in condition to receive the lubricant. Graphite or a graphite compound is generally used for this purpose, and it is preferable to force the graphite into the pockets or cavities of the bushing under such pressure as to compact the lubricant in the pockets to such a degree as to render the lubricant substantially solid and sufficiently hard to retain it in the pockets as a permanent part of the bushing. The graphite or lubricant is introduced into the interior bore of the bushing and is then compressed and forced firmly into the pockets or cavities of the bushing by a plunger operated by a hydraulic or other suitable press. Fig. 2 shows the cast bushing placed in a compression chamber 9, a plunger 9ª being arranged to enter and move axially into the bore of the bushing after the latter has been filled with the lubricant, the plunger compressing the lubricant and forcing the same outwardly and into the various pockets or cavities formed by the grooves and the perforations. A considerable force is applied to the plunger 9ª during this operation, and in consequence, the lubricant within the bushing is subjected to a heavy compression. This compression of the lubricant within the bushing exerts an expansive tendency upon the bushing, but this expansive action is sustained by the bushing without distortion thereof, owing to the fact that the metal at this stage in the manufacture of the bushing bridges the grooves 6 and hence provides a substantially continuous periphery, the continuity of the periphery of the bushing being interrupted only by the relatively small perforations which, however, do not materially diminish the ability of the bushing to sustain the pressure within the bushing which acts to expand it, whereas should the grooves 6 extend entirely through the wall of the bushing at the time the lubricant is forced into the bushing, there would be a tendency for the bushing to bulge outwardly under the expansive tendency of the internal pressure of the lubricant. The advantage of this mode of procedure is that the bore of the bushing remains uniform and the exterior diameter of the bushing remains unchanged, or substantially so, thus enabling the bushing to be cast very closely to the size the finished bushing is to have, and a minimum amount of material will have to be removed in finishing the bushing.

After the lubricant has been introduced into the ribs and perforations in the bushing, the bushing is finished by turning it down to its proper outside diameter, this operation removing the metal which previously bridged the grooves 6, thus exposing the graphite or lubricant in these grooves as well as the graphite or lubricant in the perforations 7. Also, if desirable or necessary, the interior bore of the bushing may be reamed to the proper size. The finished bushing will then contain strips of graphite or solid lubricant 10 in the grooves 6 and studs of graphite or lubricant 11 in the perforations 7.

It is preferable that the lubricant-containing grooves 6 should each extend from a point near one end of the bushing to a point near the opposite end thereof in order that the lubricant in these grooves will be distributed substantially throughout the length of the bushing but will leave continuous or uninterrupted portions at the ends of the bushing. It is also preferable to arrange the lubricant-containing grooves 6 at equidistantly spaced intervals around the surface of the bushing. The lubricant-containing grooves and perforations are so disposed that the lubricant in at least one groove or in at least one perforation will be presented to the line on which the load is sustained by the bushing, irrespective of where the load may come on the bushing. In the bushing shown, the lubricant 10 in one of the grooves 6 or the lubricant 11 in one of the perforations 7 may be presented to the line on which the load comes on the bushing with respect to both the inner and exterior surfaces of the bushing, and yet the metal of the bushing will be presented to the coöperating part which sustains the load to the full length of the bushing, excepting the relatively small area occupied either by the diagonal section of the lubricant strip 10 or the section of lubricant 11 in one of the perforations 7. In the preferred embodiment of the invention, each lubricant-containing groove 6 has such a pitch that its ends are substantially in alinement with the lubricant bodies 11 at the opposite or extreme ends, respectively, of the adjacent rows, the row of lubricant bodies 11 being preferably spaced on lines having a pitch corresponding to the pitch of the grooves 6. Of course, it will be understood that the number of lubricant-containing grooves and perforations may be varied according to the sizes of the bearings as may be desired, and also that the shapes of these grooves and perforations may vary, although it is preferable that the groves shall be relatively narrow and that the perforations shall have a relatively short length in a direction axially of the bushing or sleeve. In any case, however, the end of any lubricant-containing groove at one end of the bushing should be in the same radial plane with or overlap a lubricant-containing perforation of the adjacent row at the opposite end of the bushing, to the end that a portion of the lubricant will always be presented to that side of the bushing which sustains the load, irrespective of where the load may come on the bushing, and yet a maximum extent of bearing surface of the bushing will be presented on the line of the load.

Obviously, the lubricant-containing pockets may be formed in only the interior or only the exterior of the bushing, as where the bushing is non-rotatable in relation to the housing or shaft, respectively, the bushing shown being adapted for use in cases where the bushing is rotatable relatively to the shaft or the housing, or both.

I claim as my invention:—

1. A bearing bushing having circumferentially spaced lubricant-containing grooves partially encircling it and extending through its wall, and lubricant-containing pockets located in rows between said grooves.

2. A bearing bushing having circumferentially spaced lubricant-containing grooves partially encircling it, and series of lubricant-containing pockets arranged in rows between said grooves, the end of each groove toward one end of the bushing being in the same radial plane with a pocket in the adjacent series.

3. A bearing bushing having spaced alternately therearound and extending through its wall lubricant-containing slots and rows of lubricant-containing perforations, a portion of said slots or perforations lying in every radial plane of the bushing.

4. A bearing bushing having circumferentially spaced lubricant-containing grooves extending entirely through the wall thereof, and a series of lubricant-containing pockets arranged between each pair of grooves, each end of each groove lying in a radial plane which overlaps the pockets of the respective adjacent series.

5. A bearing bushing having a plurality of circumferentially spaced lubricant-containing grooves partially encircling it and extending through the wall thereof, and a series of lubricant-containing pockets located midway between adjacent grooves and extending parallel therewith, portions of said grooves and series of pockets lying in the same radial plane.

6. A bearing bushing having circumferentially spaced lubricant-containing grooves partially encircling the bushing and extending through the wall thereof from its inner to its outer surface, and a series of perforations interposed between adjacent grooves and containing lubricant, said perforations extending through the wall of the bushing from the outer to the inner surface thereof.

7. The hereindescribed method of making a self-lubricating bearing bushing which comprises forming a sleeve with grooves extending partially through the wall thereof, then forcing lubricant into said grooves, and finally removing material from the bushing to uncover said grooves, whereby the latter will extend entirely through the wall of the bushing.

8. The hereindescribed method of making a self-lubricating bearing bushing which comprises forming a sleeve with grooves extending from the interior thereof partially through the wall of the bushing, leaving the grooves covered by the material composing the bushing at the outer surface, then forcing lubricant into the interior of the bushing to fill said grooves therewith, and finally reducing the outer diameter of the bushing to uncover the lubricant-containing grooves at the outer surface of the bushing.

In testimony whereof I have hereunto set my hand in presence of two subscribing witnesses.

LEIGH S. BACHE.

Witnesses:
Geo. T. Smalley,
A. K. Smith.